| United States Patent Office | 3,672,803 |
|---|---|
| | Patented June 27, 1972 |

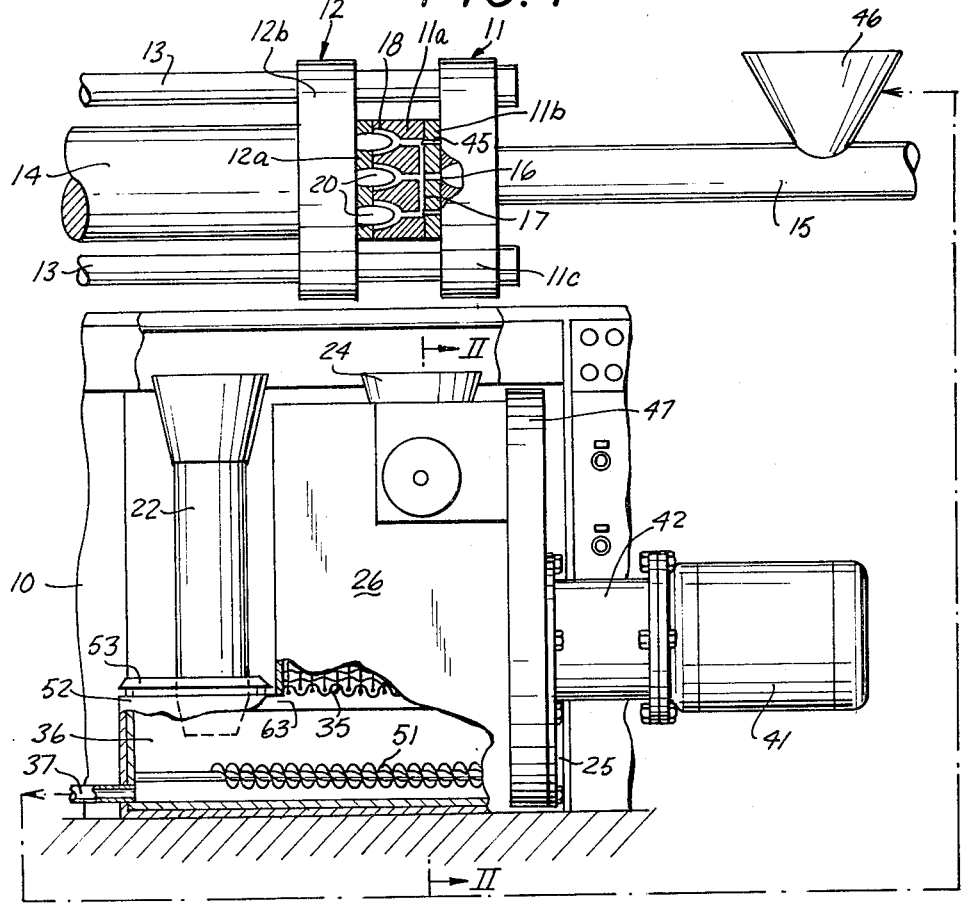
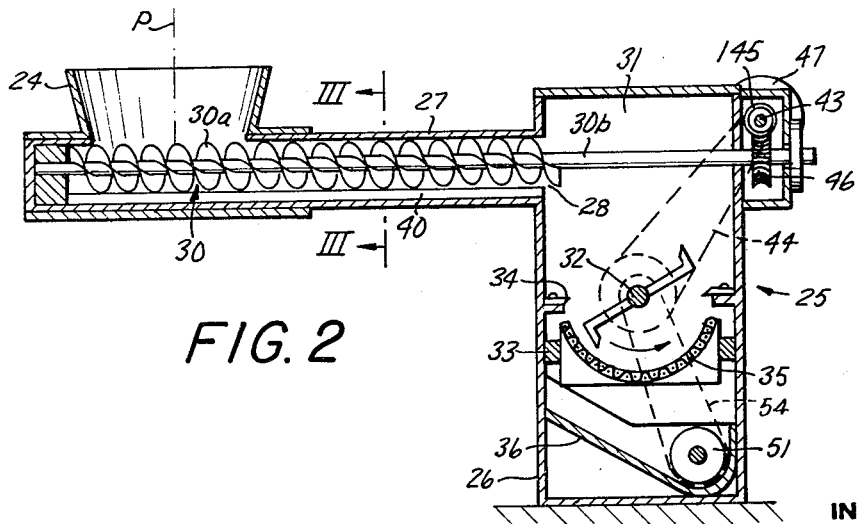

3,672,803
SCRAP GRINDER FOR INJECTION-MOLDING MACHINE
Herbert Rees, Willowdale, Ontario, Canada, assignor to Husky Manufacturing and Tool Works Limited, Bolton, Ontario, Canada
Continuation-in-part of application Ser. No. 732,148, May 27, 1968, now Patent No. 3,566,444. This application May 13, 1970, Ser. No. 36,938
Int. Cl. B29f 1/00
U.S. Cl. 425—197   7 Claims

ABSTRACT OF THE DISCLOSURE

A grinder with rotary knives is positioned below the mold level of an injection-molding machine and offset from the mold path, an auger driven by the knife motor extending horizontally from a hopper beneath the mold path to the grinder mouth for delivering runners dropping from the opening mold to a lateral entrance of a knife housing. A lateral extension of that housing receives the comminuted scrap with the aid of a second auger, disposed at right angles to the first one, and has an outlet for the return of this scrap to the machine hopper via a suction pipe.

---

This application is a continuation-in-part of my copending U.S. patent application Ser. No. 732,148 filed May 27, 1968, now Pat. No. 3,566,444.

My present invention relates to a scrap grinder to be used in conjunction with an injection-molding machine in which articles of thermoplastic material are formed together with associated runners in a split mold having two or more separable portions. A molding machine of this type has been disclosed, for example, in my U.S. Pat. No. 3,117,348.

In my U.S. Pat. No. 3,407,444 I have disclosed a grinder disposed underneath the mold in the path of ejection of the runners which drop from the mold at a location different from that where the molded articles are discharged. In order to bar any throwback of runner fragments toward the open mold by the rotating knives of the grinder, the latter also includes a rotary shutter which operates in timed relationship with the mold cycle and which also prevents an operator from accidentally reaching into the knife chamber.

The comminuted material falls from the grinder chamber through a screen into a receptacle whence this material is removed by a suction pipe. If suction fails, or if the screen becomes excessively clogged, the exhaustion of the resinous particles may not be rapid enough to prevent the formation of a dust cloud which, on escaping upwardly through the rotating shutter, may enter the open mold and contaminate its cavities. The general object of my present invention, therefore, is to provide an improved scrap grinder which, when used in conjunction with an injection-molding machine, avoids the risk of such contamination.

A more particular object is to provide effective means for removing the comminuted scrap from the grinder at a rate preventing undue accumulation thereof in the grinder housing.

Another object of this invention is to provide a scrap grinder which can be positioned at the operator's side of the machine so as to be more readily accessible than the aforedescribed grinder for purposes of cleaning, inspection or readjustment.

These objects are realized, pursuant to my present invention, by the provision of a grinder housing disposed below the mold level of the associated molding machine but at a location offset from the point of ejection, the housing having a preferably laterally disposed inlet opening through which a scrap feeder, such as an auger, extends generally horizontally from a location directly below the point of ejection.

The entrance end of the scrap feeder my be formed with a hopper or funnel which, advantageously, is angularly adjustable so that no relocation of the grinder as a whole is required upon an adjustment or replacement of the mold.

Except for the inlet opening accommodating the auger or equivalent feed means, and a discharge opening at the bottom of the housing, the grinder housing may be completely closed so as to exclude the danger of injury to an incautious operator. If the auger is powered by a frictional transmission, such as a belt drive, even an accidental insertion of one's fingers into the hopper during operation of the grinder will not lead to serious injury. Thus, I can use a single motor for driving both the rotary knives and the auger, the motor being preferably coupled with the knife rotor by a positive transmission which may include a speed reducer.

Advantageously, pursuant to a further feature of my invention, the discharge opening leads to a lateral housing extension which is upwardly open, except for an overlying protective cover, and contains a second auger designed to carry off the comminuted particles as fast as they are produced by the grinder. The extension, in turn, has an outlet for the exhaustion of the scrap which can thereby be returned to the machine hopper; if the suction pipe performing this return should become clogged, the scrap simply overflows the housing extension at a level well below that of the rotary knives so that the operation of the grinder is not impeded.

According to another feature of my invention, the main auger is surrounded over part of its length by a tubular extension of the grinder housing having an axis downwardly offset from the auger axis so as to form a crescent-shaped clearance at the bottom of the feed channel. In this clearance I dispose one or more longitudinally extending ribs serving to prevent rotary entrainment of the runner fragments by the auger and to insure their axial displacement toward the knife chamber.

The above and other features of my invention will become more fully apparent from the following detailed description of a preferred embodiment, reference being made to the accompanying drawing in which:

FIG. 1 is a fragmentary front-elevational view of an injection-molding machine equipped with a built-in grinder according to the invention;

FIG. 2 is a cross-sectional view taken on the line II—II of FIG. 1;

Figure 3:
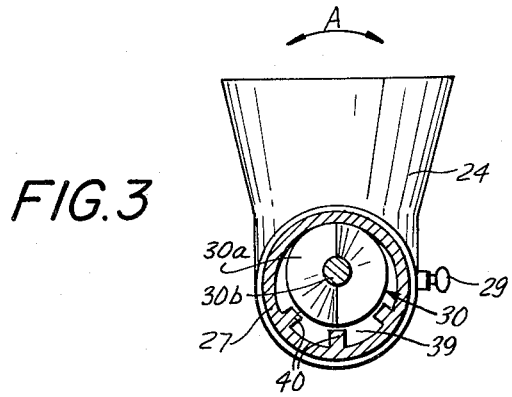
FIG. 3 is a cross-sectional view taken on the line III—III of FIG. 2.

The molding machine shown in the drawing comprises a frame 10 supporting a split mold composed of two principal portions 11 and 12, mold portion 11 being substantially stationary whereas mold portion 12 is axially reciprocable, along tie bars 13, for a periodic opening and closing of the mold as described in my aforementioned U.S. Pat. No. 3,117,348. The reciprocation of the mold portion 12 is brought about by a ram 14 linked to an intermittently driven crank not shown. Mold portion 11 communicates with a compression chamber in a piston housing 15 via a channel terminating in an orifice 16 at the interface of two relatively movable plates 11a, 11b of mold portion 11 which further includes a third stationary plate 11c. Mold portion 12 also comprises two relatively movable plates 12a and 12b.

A multiplicity of cavities 18 in mold portion 12 serve for the simultaneous manufacture of a like number of cup-shaped articles (not shown) which, upon a separation of mold portions 11 and 12, adhere to cores 20 on plate 12a while a runner structure initially formed in the interconnecting channels 17 stays in mold portion 11 where it is retained by conventional sucker pins 45 on the face of plate 11b. At a later point of the cycle, mold plate 12b separates from plate 12a and withdraws the cores 12 from which the articles are stripped by this relative motion to drop through a chute 22 onto a conveyor 23 which transports them toward a further destination. At substantially the same time, or slightly before, the mold plates 11a and 11b move apart to leave a clearance for the runner; promptly thereafter, plate 11b breaks away from plate 11c to an extent sufficient to withdraw the sucker pins 45, rigid with plate 11c, into plate 11b whereby the runner is liberated and drops into a hopper 24 below the mold portion 11.

Hopper 24 constitutes the inlet of a grinder 25 mounted on the base of machine frame 10 forwardly of the vertical axial plane P (FIG. 2) of the mold, thus at a location horizontally offset from the path of reciprocation of mold portion 12. Hopper 24 is mounted on an upwardly apertured tube 27 forming an extension of a grinder housing 26 which has a lateral inlet opening 28 near its top and a lateral discharge opening 63 at its bottom. Limited angular adjustment of hopper 24 on tube 27, as indicated by arrow A in FIG. 3, is possible upon a loosening of a clamping nut 29.

Figure 4:
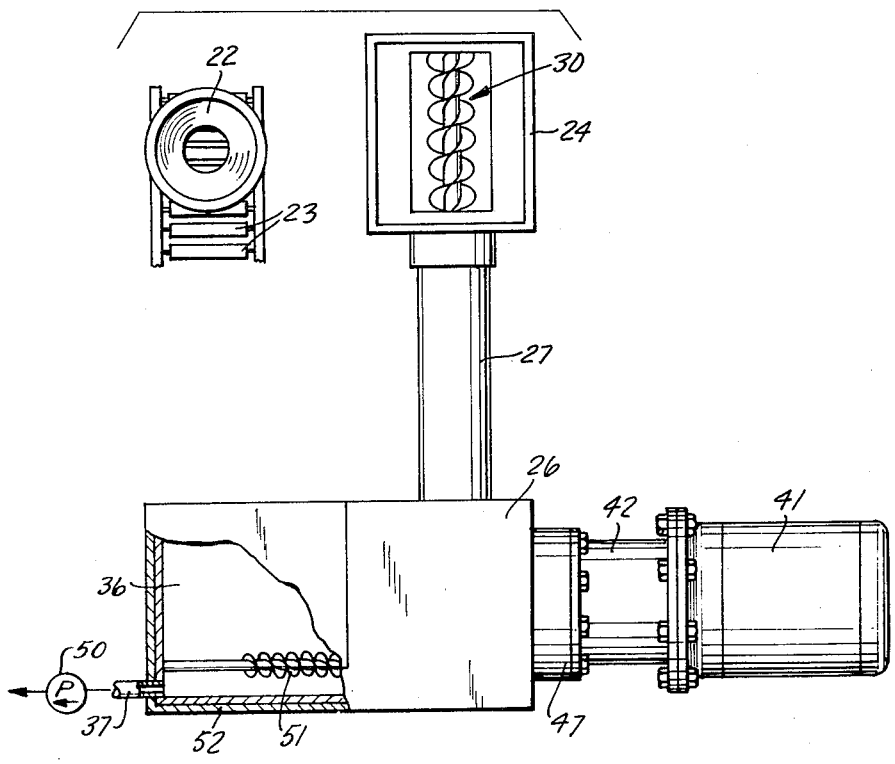
FIG. 4 is a top view of the grinder with its motor removed.

An auger 30 is horizontally journaled in housing 26 and in the closed outer end of tube 27, the helicoidal web 30a of this auger extending from the region of hopper 24 past the inlet opening 28 into housing 26 and terminating at a chamber 21 in which a shaft 32 extends skew to the auger shaft 30b. Shaft 32 carries a pair of diametrically opposite rotary knives 33 cooperating with two stationary knives 34 on the inner walls of housing 26. An upwardly concave, cylindrical curved screen 35 underlies the grinder rotor 32, 33 to receive the comminution products of the scrap delivered by auger 30 from hopper 24 to chamber 31. The comminuted particles drop onto a chute 36 which extends laterally, through a discharge opening 63, into an upwardly open box 52 forming an extension of housing 26. From this box the particles are exhausted through a pipe 37 by means of a suction pump diagrammatically indicated at 50 in FIG. 4. Screen 35 is mounted in the housing 26 above the level of the open top of box 52 which is spacedly overlain by a protective cover 53 with enough all-around clearance to enable the overflow of ground scrap in the event of a clogging of pipe 37.

As best seen in FIG. 3, the axis of auger 30 is upwardly offset from that of tube 27 so that the circumference of web 30a defines with that tube a crescent-shaped clearance 39 accommodating a plurality of longitudinal ribs 40 (here three) which serve for the guidance of the scrap toward the chamber 31.

Augers 30, 51 and rotor shaft 32 are continuously driven by a motor 41 which is positively coupled with shaft 32 through reduction gearing in a housing attachment 42 and is frictionally coupled with a gear shaft 43 via a belt drive 44 (FIG. 2). Shaft 43 carries a worm 145 which meshes with a worm gear 46 on auger shaft 30b. The belt drive 44 is accommodated in a further housing attachment 47.

It will thus be seen that I have provided an improved scrap grinder which is virtually foolproof in operation, is easily accessible to an operator standing in front of the machine, and cannot introduce any dust clouds into the mold 11, 12, owing to the continuous generation of an air draft blowing from the hopper 24 through the tube 27 into the space 31 which is under reduced pressure from suction tube 37; this air stream is intensified by the action of the continuously operating augers 30 and 51. If a large chunk of solid material, exceeding the capacity of the grinder, should fall through the hopper 24, belt 44 may slip and thereby avoid damage to the equipment; by the same token, an operator accidentally reaching into the hopper 24 during rotation of the auger 30 will bring the latter to a halt before suffering serious injuries. Naturally, the belt drive 44 could also be replaced or supplemented by a slipping clutch.

Suction pipe 37 may, as diagramamtically indicated in FIG. 1, return the reground material to a hopper 48 on the molding machine for admixture with virgin thermoplastic resin, the same kind of feedback may, of course, also be had with the aid of equivalent mechanical forcefeed means, such as a flexible auger.

In the arrangement described and illustrated, the secondary auger 51 terminates slightly short of the closed end of the box-shaped housing extension 52. Auger 51 is shown driven by a belt 54 which, like the belt 44 driving the auger 30, will slip without causing any serious accident to an incautious operator. Naturally, housing extension 52 could also be completely closed at the top, as long as an overflow edge (e.g. formed by a horizontal slot) remains for the discharge of excess scrap below the level of knives 33 and screen 35.

I claim:

1. In an injection-molding machine having a split mold with separable portions for the formation of molded articles and associated runners of thermoplastic material ejectable from said mold at different locations upon separation of said portions, the combination therewith of a grinder housing disposed below the level of said mold but horizontally offset from the point of ejection of said runners, said housing being provided with a lateral inlet opening and with a tubular first extension terminating at said inlet opening, a hopper at the free end of said first extension directly below said point of ejection for receiving said runner from said mold, a generally horizontal first auger in said first extension traversing said inlet opening for feeding said runners to said housing, a set of rotary knives in said housing below said first auger for comminuting runners entrained by same from said hopper, a generally horizontal second auger for removing ground scrap from said knives, said housing having a lateral second extension below the level of said knives accommodating said second auger, and a suction pipe at an end of said second extension remote from said housing for exhausting said ground scrap, said second extension forming an overflow edge above said second auger below the level of said rotary knives at a location offset from said hopper.

2. The combination defined in claim 1 wherein said augers and said knives are provided with common drive means.

3. The combination defined in claim 2 wherein said drive means includes a motor positively coupled with said knives and frictional transmission means between said augers and said motor.

4. The combination defined in claim 1 wherein said hopper is angularly adjustable.

5. The combination defined in claim 1 wherein said first auger has an axis upwardly offset from the axis of said tubular first extension, thereby forming a crescent-shaped clearance at the bottom of said first extension, the latter being provided with longitudinally extending rib means projecting into said clearance.

6. The combination defined in claim 1 wherein said housing is provided with a screen underneath said grinder means but above said second auger.

7. The combination defined in claim 1 wherein said augers extend at right angles to each other.

References Cited

UNITED STATES PATENTS

| | | | |
|---|---|---|---|
| 3,418,694 | 12/1968 | Strauss | 264—37 X |
| 3,349,823 | 10/1967 | Stott et al. | 241—186 A X |
| 2,997,968 | 8/1961 | Fitzpatrick et al. | 241—186 A X |
| 3,498,548 | 3/1970 | Gruendler et al. | 241—186 A X |

H. A. KILBY, JR., Primary Examiner

U.S. Cl. X.R.

146—123; 264—37; 241—186; 425—202, 217, 242, 151, 192